United States Patent
Nordmann et al.

[15] 3,665,576
[45] May 30, 1972

[54] MEANS FOR SECURING THE COILS OF AN ELECTRIC MACHINE IN THE SLOTS OF THE IRON BODY THEREOF AND DEVICE FOR INTRODUCING THE MEANS IN THE SLOTS

[72] Inventors: Harald Nordmann, Viernheim/Bergstr.; Kurt Schmidt, Bensheim/Bergstrasse, both of Germany

[73] Assignee: Aktiengesellschaft Brown, Boveri & Cie, Baden, Switzerland

[22] Filed: Sept. 18, 1970

[21] Appl. No.: 73,333

[30] Foreign Application Priority Data

Sept. 23, 1969 Germany.....................P 19 48 025.2

[52] U.S. Cl. ..........................................................29/205 R
[51] Int. Cl. .......................................................H02k 15/06
[58] Field of Search..........................29/205 R, 205 D, 205 C

[56] References Cited

UNITED STATES PATENTS 1,402,217  1/1922  Cullin...................................29/205 R Primary Examiner—Thomas H. Eager
Attorney—Pierce, Scheffler and Parker

[57] ABSTRACT

Coils are secured in the slots of the iron body of an electric machine by means of cooperating wedges which are pressed or moved into place by fluid pump means or by mechanical means.

10 Claims, 5 Drawing Figures

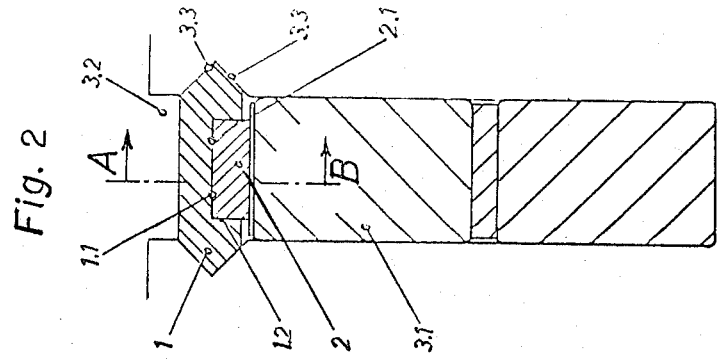
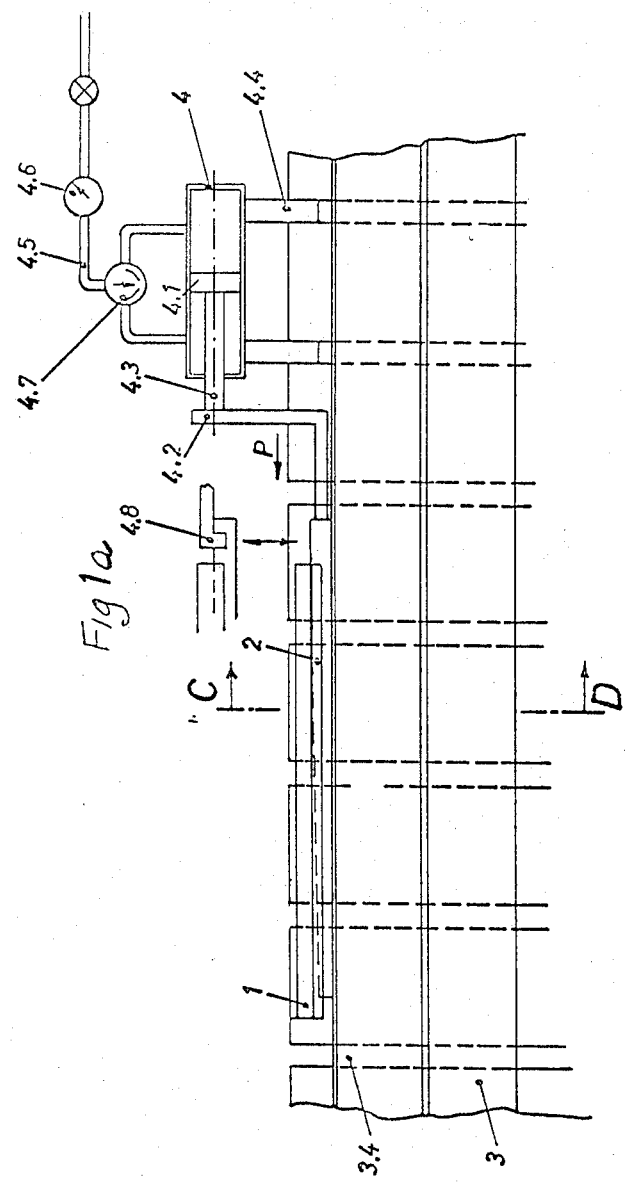
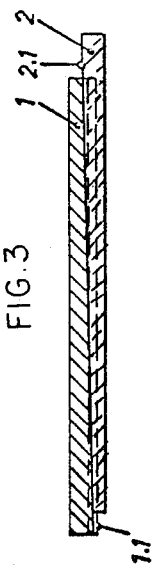

MEANS FOR SECURING THE COILS OF AN ELECTRIC MACHINE IN THE SLOTS OF THE IRON BODY THEREOF AND DEVICE FOR INTRODUCING THE MEANS IN THE SLOTS

The present invention relates to means for securing the winding rods or coils in the slots of the iron body of an electric machine or similar electric apparatus, where the slots are closed by cooperating wedges extending over a part of the length of the iron body as well as a device for pressing the wedges into the slot. Hereinafter reference will be made to coils even though rods are also included.

The conductor coils arranged in the slots of electric machines are subject to forces acting in alternating directions under the interaction of the electric current traversing them and of the magnetic field in the air gap. It is therefore necessary to lock these conductor coils in the slots to prevent movement or play therein which can be effected by wedging under mechanical stress. The alternating forces acting on the coils, if they are not locked in place, can put the coils in natural frequency under certain circumstances. Even the slightest possibility of movement in the slots can have the result that the insulation of the coils may be damaged. If the play or movement of the coils in the slots increases, the destruction of the insulation progresses rapidly. For this reason the coils must be so locked in the slots horizontally and vertically so that the alternating forces cannot loosen the coils and permit movement thereof in the slots.

Numerous arrangements for locking the coils in the slots of electric machines are already known. In most arrangements of this type the conductor coil parts are pressed against the slot base by trapezoidal or dovetailed wedges. The wedging is effected manually so that there is no possibility of determining with what exact force these wedges act on the underlying coil parts. In this type of wedging no great pressures can be exerted on the coil parts, because the friction of the wedges on the metal sides uses up a great part of the driving force. The above described embodiment has proved adequate for the machine sizes presently produced.

It has also been suggested to provide springs between the slot wedge and the conductor coil. This can result in a certain improvement with respect to the known arrangements, but a clear determination of the force acting on the coil parts is still not possible in such an arrangement.

It is an object of the present invention to improve the known arrangements and to provide an arrangement for locking coils in the slots of electric machines which permits a relatively great force to be exerted on the conductor coils, and where this force is substantially equal in all the slots. The new arrangement permits one to control the forces acting on the coil parts and to make them strong enough to exceed at least the precalculated jarring force, because the size of the pressure acting on the coil insulation must be at least the same as the jarring force plus an additional force for possible aging of the coil parts. Since the effect of aging can be easily determined on the fatigue test model, a defined, specific pressure can be determined. The specific pressure can then be produced and maintained with the method described below.

The solution of the problem in the above mentioned arrangement according to the present invention consists in that cooperating wedges consist of at least one upper prismatic body, or wedge, the bottom surface of which extends on an incline in the longitudinal direction, and of a lower prismatic body or wedge having an upper inclined surface facing the upper prismatic body and inclined in the opposite direction relative to the slope of the bottom surface of the upper body. This arrangement permits one to exert relatively great radial forces on the conductor coils.

Preferably the inclined upper surface of the lower body fits into a recess on the underside of the upper prismatic body so as to guide the lower prismatic body as it is forced into position. The recess can be produced by milling or by broaching.

In a further development of the invention, a layer of hardenable casting resin is applied between the opposing surfaces of the two prismatic bodies, shortly before the lower prismatic body is inserted in the recess. This serves to reduce the friction and later on to cement the two prismatic bodies together.

The slope of the inclined surfaces should be only so great that the two prismatic bodies are self-locking with regard to the wedge effect and that only small shearing forces are necessary on the end face of the driven wedge.

The prismatic bodies are pressed together by means of devices which are also an object of the invention. One such device consists according to the invention of a fluid pressure cylinder which may be hydraulic or pneumatic and a piston therein on the piston rod of which is arranged a member which acts on the end face of the lower prismatic body. The pressure cylinder has cams or projections which engage the air vents and which can be adjusted to the interval of the air slots of the iron body of the electric machine or apparatus, or it can be secured to at least one additional prismatic body for engaging the recesses of the slot. The pressure cylinder can also be secured on a prismatic body which can move in the recesses and can be locked therein.

In a further development of the device according to the invention, a pressure valve is provided in the feed line to the pressure cylinder which responds when a predetermined adjustable pressure is attained.

In this way it is possible to prevent the pressure on the end face of the lower prismatic body from exceeding a certain value, so that the pressure on the conductor coils is also limited to a certain value. Since a hardenable synthetic resin may be applied to the subsequently sliding engaging surfaces shortly before the lower prismatic body is pressed into place as mentioned above, this resin acts as a lubricant and the friction condition are very uniform. The radial pressure acting on the conductor coils is thus proportional to the force acting on the front side of the lower prismatic body, which in turn is proportional to the pressure of the pressure medium fed to the piston. The measuring instrument for the pressure medium can be calibrated directly for the values of the pressure acting on the conductor coils.

For repairs in power plants etc. where there is no provision for generating pressure, another device may be provided which uses mechanical means. Such a device for pressing in a slot wedge is characterized by a rack moving in a guide, which meshes with a gear wheel driven by a ratchet, a member being arranged at one end of the rack which acts on the end face of the lower prismatic body. The guide may have cams or projections engaging the air vents which can be adjusted to the interval between the air vents of the iron body of the electric machine or apparatus, or the guide can be secured on at least one additional prismatic body engaging the recesses of the slot.

The ratchet acts preferably on the pinion over an adjustable slipping clutch which responds when a predetermined torque has been exceeded.

With the above mentioned devices it is possible to adjust or control the pressure acting on the conductor coils so that a predetermined force acts in all slots.

In both devices described above, the member acting on the lower prismatic body is preferably L-shaped.

Embodiments of an arrangement for securing the winding coils and of a device for pressing the wedge in the slot are represented in the drawing and will be described more fully below.

FIG. 1 shows a partial longitudinal section through the stator of a turbogenerator with slot wedges and a fluid device for pressing in one of the wedges.

FIG. 1a shows an alternative detail of FIG. 1 in longitudinal section.

FIG. 2 shows a cross section along the line C–D of FIG. 1.

FIG. 3 shows a partial longitudinal section along the line A–B of FIG. 2.

Figure 4:
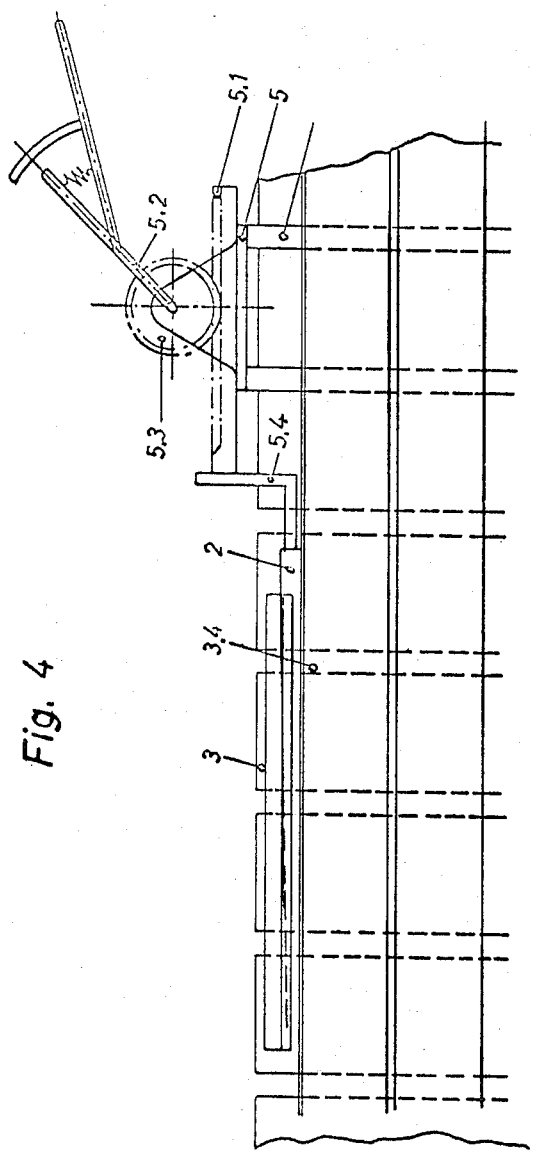
FIG. 4 shows a partial longitudinal section like FIG. 1, with a mechanical device for pressing in one of the slot wedges.

In the drawing, 1 denotes the upper and 2 the lower prismatic body, which jointly press the conductor rod or coil 3.1 against the bottom of the slot 3.2 stamped in the bundle of stampings 3 by bearing against the recesses 3.3 in the bundle of stampings. The bottom side of the prismatic body 1 facing the prismatic body 2 has a recess 1.2 which has slot inclination 1.1 in the longitudinal direction. The upper surface 2.1 of the lower prismatic body 2 guided in the recess 1.2 has likewise an equal inclination, but in the opposite direction, so that when the lower prismatic body is pressed in or moved in an axial direction, a radial pressure is produced in the direction of the conductor rod or coil 3.1.

FIG. 1 also shows the device for pressing in or moving the lower prismatic body 2. This device consists of a double-acting pressure cylinder 4 in which a piston 4.1 moves. The piston 4.1 is connected to a piston rod 4.3 with an L-shaped member 4.2, which acts on one end face of the lower prismatic body 2.

By a control valve 4.7 arranged in the fluid pressure medium line 4.5 the piston 4.1 can be selectively moved to one or the other end of the cylinder 4 by the pressure medium such as compressed air, oil or water, and thus be moved in either direction. In the pressure medium line 4.5 there is also arranged an overpressure valve which interrupts the supply of pressure medium at a certain predetermined pressure. Furthermore the pressure cylinder 4 has cams 4.4 with a displaceable interval therebetween so as to engage the air vents 3.4 of the stator 3 of the electric machine at a corresponding interval and bear against the vents during the pressing or locking process.

Before the prismatic body 1 or 2 is inserted, the mutually inclined surfaces 1.1 and 2.1 respectively, which later slide on one another, are brushed with a cold-hardening casting resin, which has the effect of considerably reducing the friction of the sliding surfaces. After the member 4.2 is pressed against the end face of the lower prismatic body 2, the supply of pressure medium is started by means of the reversing valve 4.7 and the piston is moved to the left until the pressure valve 4.6 indicates the desired pressure and shuts off the pressure medium automatically. The conductor rod or coil is then pressed with the desired force in a radial direction against the slot base.

If it should be necessary for repair or for some other reason to remove the lower prismatic body 2, a gripping hook 4.8 as shown in FIG. 1a, arranged on the L-shaped member can be engaged in a recess in the lower prismatic body 2. In this case the reversing valve 4.7 can be set so that the pressure medium is admitted into the space to the left of the piston 4.1 of the pressure cylinder 4 to cause a movement in the direction to the right to take place whereby the lower wedge can be removed.

A mechanical device for pressing in the lower prismatic body 2 is represented in FIG. 4. In this device a rack 5.1 is mounted for displacement in a guide 5. The rack 5.1 meshes with a pinion rotating on a shaft (not represented), which can be operated by hand over a slipping clutch by means of a ratchet 5.3. The shaft for the pinion is mounted on bearings secured on the guide 5. Connected with the rack 5.1 is an L-shaped member 5.4, as described above, which transmits the force acting on the ratchet to the end face of the prismatic body 2 to be pressed in. The pressing operation takes place in a similar manner as in the device represented in FIG. 1, as described above. When a certain pressure is attained, the clutch slips so that a defined radial pressure is exerted by the wedge on the conductor rod or coil 3.1.

On the guide 5 are arranged displaceable cams 5.5 just as in the device actuated by a pressure medium, which engage the air vents 3.4 of the bundle of stampings 3 in the stator.

We claim:
1. Means for securing the coils in the slots of the iron body of an electric machine, comprising at least one pair of cooperating wedges extending over at least a part of the length of the iron body for closing the slots, each of said pair of wedges comprising an upper prismatic body, the bottom surface of which is inclined in a longitudinal direction, and a lower prismatic body the upper surface of which faces the bottom inclined surface of said upper prismatic body and is inclined in the opposite direction relative to the slope of the bottom surface of the upper prismatic body.

2. Means as claimed in claim 1 wherein the bottom surface of the upper prismatic body is provided with a recess inclined longitudinally therein, the upper surface of said lower prismatic body being received in said recess and guided therealong.

3. Means as claimed in claim 2, wherein the recess is produced by machining.

4. Means as claimed in claim 1, and further comprising a layer of hardenable casting resin disposed between the opposing surfaces of the two cooperating prismatic bodies.

5. A device for pressing together the at least one pair of cooperating wedges as claimed in claim 1 comprising a member acting on the end face of said lower prismatic body, means for actuating said member to drive said lower prismatic body into extended engagement with the bottom surface of said upper prismatic body, and adjustable cam means in the air vents for supporting said actuating means.

6. A device as claimed in claim 5 wherein said actuating means comprises a fluid pressure cylinder, a piston therein, a piston rod for actuating said member to act on the end face of said lower prismatic body and adjustable means projecting into and engaging the air vents of the electric machine for supporting said pressure cylinder.

7. A device as claimed in claim 6 and further comprising a line for feeding fluid under pressure to said pressure cylinder and a pressure valve in said line for controlling the flow of said fluid when a predetermined pressure is attained.

8. A device as claimed in claim 5 wherein said actuating means comprises a rack, a guide for said rack, a gear wheel meshing with said rack, a ratchet for driving said gear wheel, said member being arranged at one end of said rack to act on the end face of said lower prismatic body, and adjustable projections extending from said guide for engaging the air vents of the electric machine for supporting said actuating means.

9. Device according to claim 8, and further comprising a pinion over said ratchet and an adjustable slipping clutch acting on said pinion, said clutch controlling said pinion when a certain torque is exceeded.

10. A device as claimed in claim 5 wherein said member is L-shaped.

* * * * *